United States Patent [19]

Takahashi

[11] Patent Number: 4,657,425
[45] Date of Patent: Apr. 14, 1987

[54] DEVICE FOR LOCKING ROD AGAINST MOVEMENT IN EXTENDING AND CONTRACTING DIRECTIONS

[75] Inventor: Atsushi Takahashi, Fujisawa, Japan
[73] Assignee: Nifco, Inc., Yokohama, Japan
[21] Appl. No.: 832,966
[22] Filed: Feb. 25, 1986
[30] Foreign Application Priority Data Mar. 1, 1985 [JP] Japan .............................. 60-28115[U]

[51] Int. Cl.$^4$ ................................................ F16B 7/10
[52] U.S. Cl. ...................................... 403/104; 248/411
[58] Field of Search ...................... 248/411; 192/81 C; 403/229, 104

[56] References Cited
U.S. PATENT DOCUMENTS 1,989,171  1/1935  Kohlen ................................ 403/229
3,856,253  12/1974 Seebinger ....................... 403/104 X
3,967,831  7/1976  Chang et al. ................... 403/229 X
4,131,167  12/1978 Richey ............................ 403/229 X Primary Examiner—Andrew V. Kundrat
Attorney, Agent, or Firm—Trexler, Bushnell & Wolters, Ltd.

[57] ABSTRACT

A device for locking a rod against movement in an extending or contracting direction is disclosed. In the device, a torsion spring is provided between a cylindrical receptacle and an operating member rotatably mounted thereon. The rod member, which is inserted in the receptacle, is normally locked against movement by the torsion spring. The rod can be released from the locked state for movement in an extending or contracting direction by releasing the clamping force of the spring by turning the operating member.

4 Claims, 4 Drawing Figures

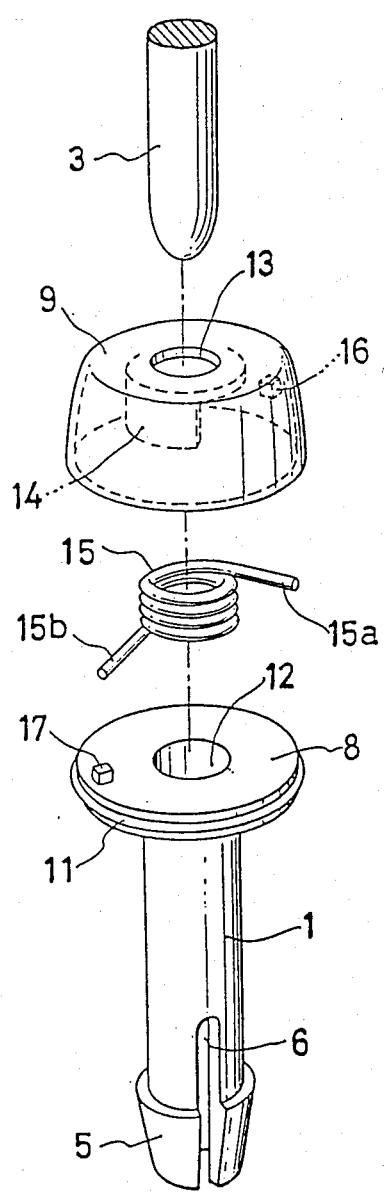
FIG_1
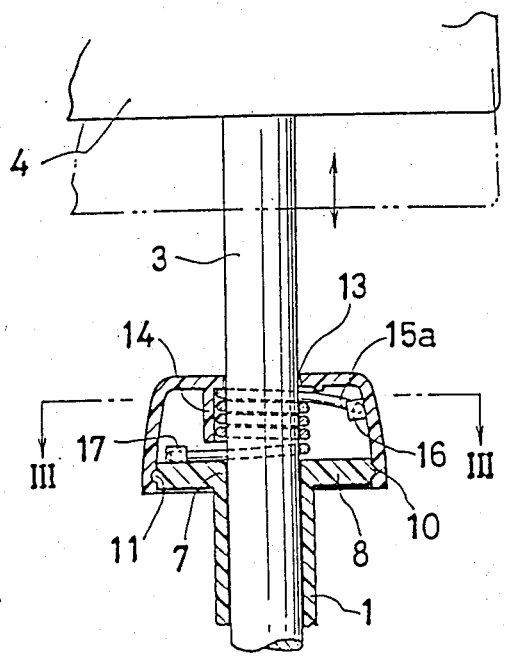
FIG_2
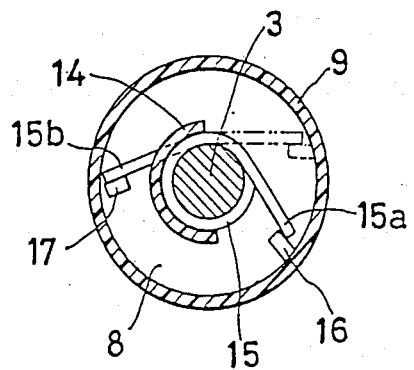
FIG_3

DEVICE FOR LOCKING ROD AGAINST MOVEMENT IN EXTENDING AND CONTRACTING DIRECTIONS

FIELD OF THE INVENTION AND RELATED ART STATEMENT

The invention relates to a device for locking a rod against movement in the extending and contracting directions, in which a rod slidably inserted in a pipe-like receptacle can be held locked at a desired position with respect to the receptacle by clamping means provided at the open end of the receptacle.

In many cases, it is convenient to provide an extensible holder or an extensible pipe. In such cases, usually telescoped pipes are coupled together such that they can be extended and contracted to adjust the overall length.

In such a case, it is generally very important to enable a slidably inserted pipe (i.e., rod) to be locked at a desired position with respect to the other pipe so as to provide a selected length and to enable this to be done simply.

In a commonly adapted locking method, the slidably inserted pipe member is provided with a spring-biased pin capable of being projected and retracted, while the other pipe member has a plurality of peripheral recesses or through-holes for receiving the pin. The inserted pipe member can be locked against movement in the extending and contracting directions in a withdrawn state by the engagement of the pin in a selected one of the recesses or through-holes. In another well-known method, one of the two telescoped members, that constitutes the receptacle, is provided with a longitudinal slit extending from an open end, and also its end portion adjacent to that end is tapered and is formed with a male thread. A coupling with a female thread is fitted on the tapered end portion. The inserted pipe member can be locked with respect to the receptacle pipe member by reducing the diameter of the tapered end portion and thus bringing the portion into forced close contact with the inserted pipe member with the tightening of the coupling. In the former well-known method, however, the length adjustment can be made only stepwise since the lock is effected by the engagement of the pin in one of the recesses or holes. In the latter method, the length can be adjusted continuosly. On the demerit side, however, the lock is effected by the clamping force of the coupling. Therefore, a considerable clamping force is needed to ensure stable locking. This is not satisfactory from the standpoint of the operability.

OBJECT AND SUMMARY OF THE INVENTION

An object of the invention is to provide a device for locking a rod against movement in extending and contracting directions, which can be extensively utilized as locking means for locking camera tripod legs against extension and contraction, means for adjusting the length of an extensible pipe-like holder or means for adjusting the height of a head rest provided atop a back rest of an automotive seat.

To attain the above object of the invention, there is provided a device for locking a rod against movement in extending and contracting directions which comprises a receptacle, the rod being slidably fitted in the receptacle, a cap-like operating member rotatably mounted on the receptacle and having a through-hole penetrated by the rod, and a torsion spring accommodated in the operating member and having a coiled portion normally in a small diameter state having an actual inner diameter smaller than the diameter of the rod, the torsion spring being fitted on the rod such that it normally holds the rod locked in a clamped state, the torsion spring having one end held in contact with the receptacle and the other end held in contact with the operating member, the torsion spring being released from the locked state for movement in the extending or contracting direction by increasing the inner diameter of the coiled portion by turning the operating member.

The rod member inserted in the pipe-like receptacle is normally locked by the torsion spring, but the rod can be released by merely turning the operating member.

The above and other objects and features of the invention will become apparent from the detailed description with reference to the accompanying drawings.

BRIEF DESCRIPTION OF THE DRAWINGS

FIG. 1 is an exploded perspective view showing an essential part of an embodiment of the locking device according to the invention;

FIG. 2 is an axial sectional view showing an essential part of the same embodiment in use;

FIG. 3 is a sectional view taken along line III—III in FIG. 2; and

DETAILED DESCRIPTION OF THE PREFERRED EMBODIMENT

Figure 4:
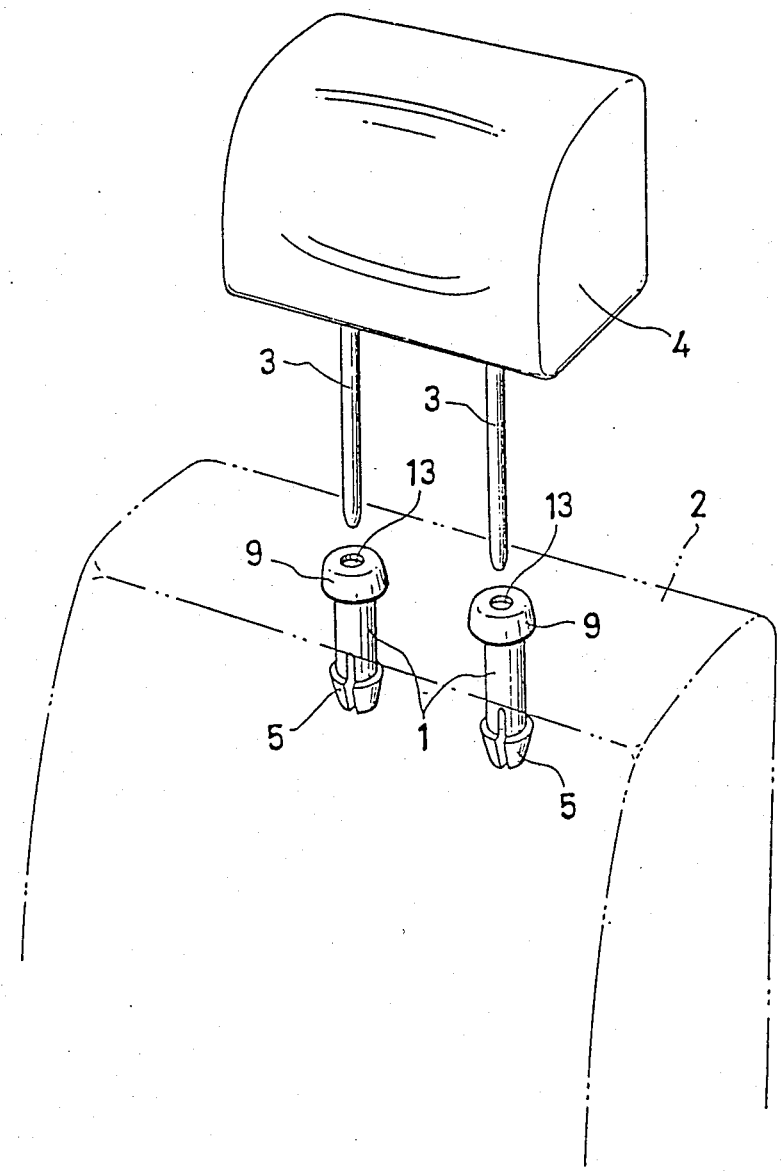
FIG. 4 is a perspective view for explaining an example of use.

In the illustrated embodiment, the invention is applied to a device for adjusting the height of a head rest in a seat of an automobile. Reference numeral 1 designates receptacles which are embedded in the top of a back rest 2 of a seat. Reference numeral 3 designates rods supporting a head rest 4. The rods 3 are inserted in the receptacles 1 to secure the head rest 4 to the back rest 2.

The receptacles 1 are cylindrical members made of a plastic material. Each receptacle 1 has an end portion 5 tapering toward its tip and a central slit 6 extending through the end portion 5, so that it can be driven in from the top of the back rest 2, which includes a cushioning material, by making use of the tapered end portion 5.

Each receptacle 1 has a disk-like thick flange 8 provided at its upper open end 7. An operating member 9 in the form of a cap is fitted on the flange 8.

The operating member 9 has an annular groove 10 formed in the inner wall in the vicinity of the open bottom. The flange 8 has an annular ridge 11 provided around the edge. The operating member 9 is rotatably mounted on the flange 8 with the annular groove 10 fitted on the annular ridge 11. The top of the operating member 9 has a central through-hole 13 aligned with the inner space 12 of the receptacle 1. The operating member 9 has a support frame 14 having an arcuate sectional profile depending coaxially from the inner side of the edge of the through-hole 13 so as to surround the through-hole 13. A coiled torsion spring 15 is provided in the support frame 14 with its opposite ends 15a and 15b projecting outwardly.

The coiled portion of the torsion spring 15 has an inner diameter smaller than the outer diameter of the rod 3. When the torsion spring 15 is accommodated in the support frame 14, the coiled portion is aligned with the through-hole 13.

When the operating member 9 is mounted on the flange 8 of the receptacle, the torsion spring 15 faces the hole 13. The torsion spring 15 is set between the receptacle and the operating member with one end 15a in contact with a protuberance 16 provided on the operating member 9 and the other end 15b in contact with a protuberance 17 provided on the flange 8.

The above embodiment of the invention is assembled as follows. The two rods 3 depending side by side at a center-to-center distance which corresponds to the center-to-center distance between side-by-side receptacles 1 at the top of the back rest 2, are passed downwardly through the holes 13 of the operating members 9 and then through the coiled portions of the torsion springs 15 provided in the operating members 9 into the inner spaces of the receptacles 1.

Since the inner diameter of the coiled portion of the torsion spring 15 is smaller than the diameter of the rod 3, the rod cannot be freely inserted through the coiled portion. Therefore, the coiled portion is expanded by unwinding it by urging the end 15a with rotation of the operating member 9 in the counterclockwise direction in the Figure.

When the two rods depending from the head rest have been inserted into the receptacles 1 to the desired position, the spring unwinding operation of the operating members 9 is stopped, whereby the torsion springs are restored to the initial reduced diameter state. Thus, the periphery of each rod is clamped so that the rods are locked against movement in their length directions. The rods are thus secured at that position to maintain the corresponding height of the head rest.

When it is desired to change the height of the head rest, the actual inner diameter of the coiled portion of the torsion springs 15 is increased again by turning the operating members 9. The rods 3 now can be displaced in the length direction so that the height can be adjusted.

With the device according to the invention, the rod can be freely extended and contracted with respect to the receptacle with the uncoiling of the torsion spring by the operating member, and also it can be readily locked again by restoring the torsion spring with the release of the operating member. The operation is simple and can be very easily done. Further, since the periphery of the rod is locked by the restoring force of the spring, the rod can be reliably locked against movement, so that high reliability can be obtained. Further, the same state of locking can be obtained irrespective of the position of the rod with respect to the receptacle. It is thus possible to lock the rod in a steplessly selected position, which is very convenient for height adjustment.

The lock of the rod in the device according to the invention is obtained substantially due to the clamping force of the torsion spring 15. The clamping force can be increased by enhancing the spring character and also increasing the number of turns of the coiled portion of the torsion spring. Results of tests show that the spring force need not be so very strong and the rod can be sufficiently locked against movement by a spring force such that the rod can be released from locking by rotating the operating member with the fingers.

Further, in the above embodiment two receptacles 1 each with the torsion spring 15 are provided for the respective rods. However, even with a single receptacle a sufficient effect can be expected as a device for adjusting the height of the head rest.

Further, while the above embodiment of the invention concerns with a device for adjusting the height of a head rest, since the described structure permits a rod which can be freely moved in a pipe-like receptacle to be clamped against movement at a desired position, the device according to the invention can be extensively utilized not only as locking means for locking telescoped pipes to each other but also as stopper means permitting extension and contraction of pipe-like rods, camera tripod legs and holders of various tools.

Further, in the above embodiment the flange 8 is provided at the open end of the receptacle and the operating member 9 is rotatably mounted on the flange 8. The flange 8, however, is provided to increase the diameter of the operating member so as to facilitate the unwinding of the torsion spring 15. In other words, it is possible to omit the flange and rotatably mount the operating member directly on the receptacle top.

What is claimed is:

1. A device for locking a rod against movement in extending and contracting directions comprising a receptacle, said rod being slidably fitted in said receptacle, a cap-like operating member rotatably mounted on said receptacle and having a through-hole penetrated by said rod, and a torsion spring accommodated in said operating member and having a coiled portion normally in a small diameter state having an actual inner diameter smaller than the diameter of said rod, said torsion spring being fitted on said rod such that it normally holds said rod locked in a clamped state, said torsion spring having one end held in contact with said receptacle and the other end held in contact with said operating member, said torsion spring being released from the locked state for movement in the extending or contracting direction by increasing the inner diameter of said coiled portion by turning said operating member, said receptacle being cylindrical and having a disk-like flange provided at the upper end, said flange having an annular ridge provided around the edge, said operating member having an annular groove formed in the inner wall in the vicinity of the open end, said annular ridge being capable of being fitted in said annular groove.

2. A device for locking a rod against movement in extending and contracting directions comprising a receptacle, said rod being slidably fitted in said receptacle, a cap-like operating member rotatably mounted on said receptacle and having a through-hole penetrated by said rod, and a torsion spring accommodated in said operating member and having a coiled portion normally in a small diameter state having an actual inner diameter smaller than the diameter of said rod, said torsion spring being fitted on said rod such that it normally holds said rod locked in a clamped state, said torsion spring having one end held in contact with said receptacle and the other end held in contact with said operating member, said torsion spring being released from the locked state for movement in the extending or contracting direction by increasing the inner diameter of said coiled portion by turning said operating member, said operating member having a support frame surrounding part of said through-hole, said torsion spring being received in said support frame.

3. The locking device according to claim 2 wherein said support frame comprises a sector of a cylinder having a lower end positioned above the lower end of said cap-like operating member, one end of said torsion spring extending beneath the lower end of said support frame.

4. A device for locking a rod against movement in extending and contracting directions comprising a receptacle, said rod being slidably fitted in said receptacle, a cap-like operating member rotatably mounted on said receptacle and having a through-hole penetrated by said rod, and a torsion spring accommodated in said operating member and having a coiled portion normally in a small diameter state having an actual inner diameter smaller than the diameter of said rod, said torsion spring being fitted on said rod such that it normally holds said rod locked in a clamped state, said torsion spring having one end held in contact with said receptacle and the other end held in contact with said operating member, said torsion spring being released from the locked state for movement in the extending or contracting direction by increasing the inner diameter of said coiled portion by turning said operating member, said receptacle having a longitudinal slit extending from its lower end and also having a tapered end portion terminating in said lower end.

* * * * *